INVENTORS,
RICHARD F. GRANTGES,
JOHANN HOLZER &
MARTIN WEINSTOCK.
BY Harry M. Saragovitz
ATTORNEY.

TUNE DIVISION MULTIPLEX DIGITAL COMMUNICATION SYSTEM EMPLOYING DELTA MODULATION

Filed Nov. 25, 1960 4 Sheets-Sheet 2

INVENTORS,
RICHARD F. GRANTGES,
JOHANN HOLZER &
MARTIN WEINSTOCK.

BY Harry M. Saragovitz

ATTORNEY.

INVENTORS,
RICHARD F. GRANTGES,
JOHANN HOLZER &
MARTIN WEINSTOCK.
BY Harry M. Saragovitz
ATTORNEY INVENTORS,
RICHARD F. GRANTGES,
JOHANN HOLZER &
MARTIN WEINSTOCK.
BY
Harry M. Saragovitz
ATTORNEY.

3,165,588

TUNE DIVISION MULTIPLEX DIGITAL COMMUNICATION SYSTEM EMPLOYING DELTA MODULATION

Johann Holzer, Elberon, Richard F. Grantges, Madison, and Martin Weinstock, Long Branch, N.J., assignors to the United States of America as represented by the Secretary of the Army Filed Nov. 25, 1960, Ser. No. 71,839
11 Claims. (Cl. 179—15)
(Granted under Title 35, U.S. Code (1952), sec. 266)

The invention described herein may be manufactured and used by or for the Government for governmental purposes, without the payment of any royalty thereon.

The invention relates in general to digital communication systems and more particularly to digital communication systems whereby analogue information is transmitted by digital means.

The invention will be described in connection with a telephone system, but it is to be understood that the invention can be applied to other communication systems, such as telegraph, teletype and television.

The invention is motivated by the approach to limits of expansion imposed by the present day systems that prevent the fulfillment of the ever increasing new needs for the transmission of intelligence over long distances. The transmission of information over present overburdened systems present the ever present problems of noise accumulation, frequency and phase distortion buildup and cross-talk. Though trunk circuits are engineered to high technical standards the developing need for increased tandem trunking brought about by direct distant dialing means that even these high standards will need to be revised upwards.

Because of the way the telephone plant has had to expand and develop meeting each new demand for service by a modification of existing plant the systems existing today represent something of a hodgepodge, from a system engineer's viewpoint. The point is approached where necessity will require a fundamental reappraisal of the communication plant leading to a more efficient system design capable of meeting the new need to supply communication service—not just telephone service. A new more efficient means for handling information which will meet the new needs is the digital technique.

It is, therefore, an object of this invention to employ digital techniques in a communication system.

Another object of the invention is to provide a telephone system in which each telephone set provides facilities to convert speech signals into digital information and reconvert digital information into audible signals.

Another object of the invention is to provide a communication system in which all information is transmitted in binary digital form and on a time division basis.

Another object of the invention is to provide a switching process which rearranges digital time division signals in such a way that information can be interchanged between any two digital channels.

Other objects and a fuller understanding of the invention may be had by referring to the following description and claims, taken in conjunction with the accompanying drawings, in which:

Figure 1:
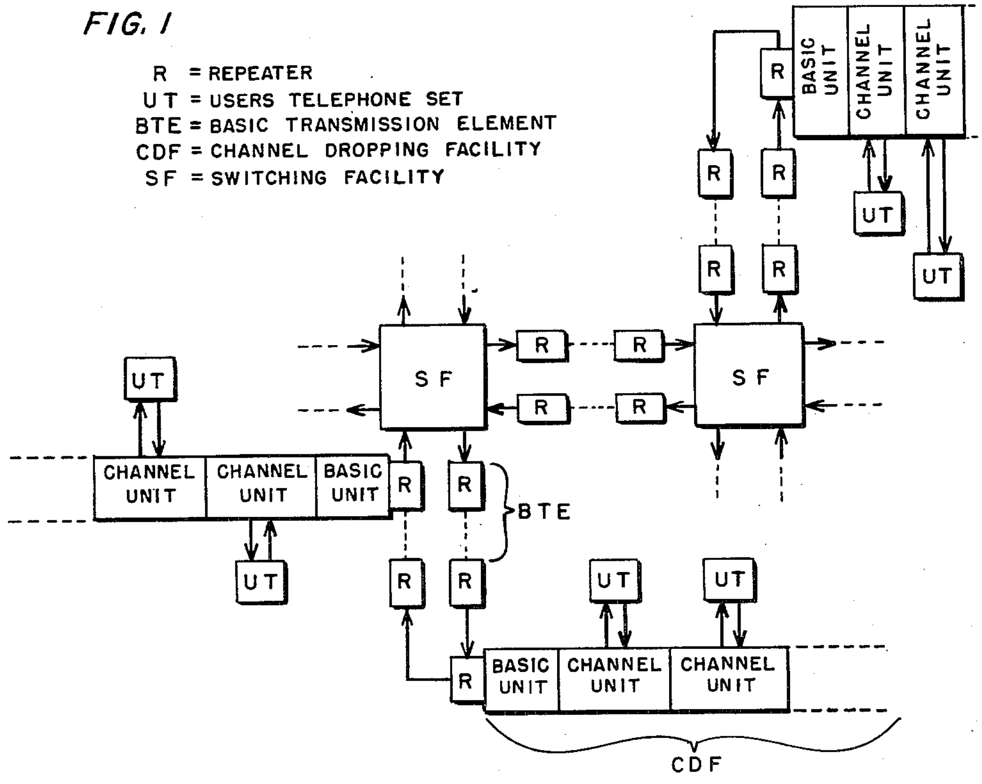
FIGURE 1 shows the general plan of the system for telephone service.

The general plan of the system for telephone service is shown in block diagram form in FIGURE 1. Switching facilities (SF) are interconnected by digital trunk lines, and the users' telephone sets (UT) are connected to the switching facilities by local distribution facilities utilizing digital trunk lines in conjunction with several channel drop facilities (CDF). The digital trunk lines may be composed of any suitable transmission media with or without regenerative repeaters (R) inserted. Switching, trunking, and looping are all performed on a purely binary digital basis. At a user's telephone set information to be transmitted is converted into binary digital form before it is transmitted. The binary pulses are applied to a channel drop facility where the pulses are inserted into a pulse train on a time division basis. The incoming pulse train is applied to a switching facility where it is demultiplexed and the binary pulses are inserted into an outgoing pulse train on a time division basis. The latter pulse train is placed on the digital trunk line which serves the called telephone set. The binary pulses are then separated from the pulse train by a channel drop facility serving the receiving user's telephone set. It is within the called telephone set that the binary pulses are converted back to the original analog signal. When two users are carrying on a conversation there are two separate connections between the two users. That is, each user's telephone set has a transmit connection and a receive connection made to the other user's telephone set.

The user's telephone set provides facilities to convert speech signals into binary digital information and reconvert binary digital information into audible signals. It also provides for the transmission of dial information to a switching facility and the reception of signalling information from a switching facility.

Figure 2:
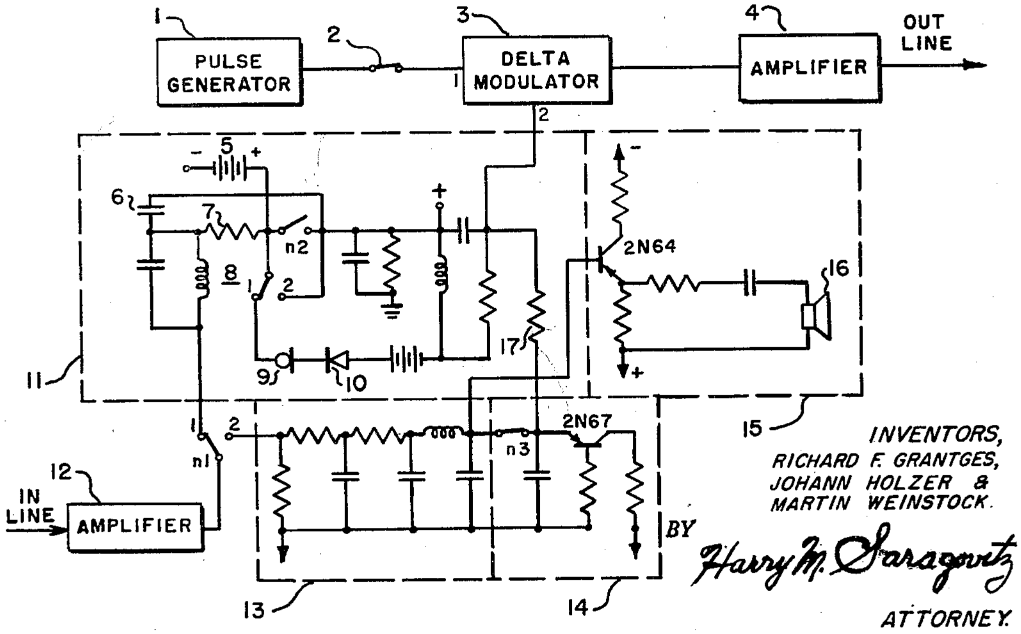
FIGURE 2 shows a schematic drawing of the user's telephone set.

A user's telephone set is disclosed by a schematic diagram in FIGURE 2. It consists of a pulse generator 1, a dial contact 2, a delta modulator 3, an output amplifier 4, a control and microphone circuit 11, an input amplifier 12, a demodulator 13, a ringing circuit 14, and an audio amplifier 15. The pulse generator 1 can be a relaxation oscillator which generates pulses at a rate of about 40 kc. per second. The delta demodulator 3 may be of the type described in U.S. Patent 2,859,408 or it may be any conventional delta demodulator. The demodulator 13 is an integrator circuit and its function is to convert binary digital pulses into an analog signal. The ringing circuit 14 is a relaxation oscillator and its purpose is to produce a signal which will be heard as an audible ringing sound at the earpiece 16 of the audio amplifier 15. The control and microphone circuit 11 comprises a microphone 9, a battery 5, switch $n2$ and a relay 8 consisting of a coil and a contact having two positions. The contact of relay 8 is normally in position 1. When pulses are applied to the coil the contact assumes position 2. During normal operations (when receiver is off the hook) switch $n2$ is closed and the capacitor 6 will carry no charge. As soon as switch $n2$ is opened the positive side of battery 5 will draw current out of capacitor 6 through resistance 7 developing such a voltage drop across this resistance so that the voltage drop across the input amplifier 12 becomes almost zero. Eventually the capacitor will charge up to full battery voltage, thus causing no more voltage drop across the resistance 7. The charging time is about five seconds during which time incoming signals are not recognized by the set.

The pulse generator 1 generates pulses at a rate of 40 kc. per second and they are applied through dial contact 2 to input 1 of delta modulator 3. An analog signal which is to be transmitted is applied to input 2 of delta modulator 3. The output of the delta modulator is the analog signal converted into binary digital pulses at an information rate of 40 kc. per second. These binary digital pulses are amplified by amplifier 4 and placed on the outgoing line.

When the handset of the user's telephone set is on the hook and no signals are coming in all switches are in the positions shown in FIG. 2, i.e., switch *n1* is in position 1, switch *n2*, a normally open switch, is opened, switch *n3*, a normally closed switch, is closed and the contact of relay 8 is in position 1. Now, when the handset is taken off the hook the following occurs: switch *n1* assumes position 2; switch *n2* closes and connects the positive end of battery 5 to the positive input of the set and it also closes the control and microphone circuit 11 via diode 10; switch *n3* opens and disconnects the ringing circuit 14 from the remainder of the circuit; pulse generator 1 starts generating pulses which are applied to input 1 of delta modulator 3; a constant signal is applied to input 2 of delta modulator 3; delta modulator 3 will produce binary pulses which are amplified by amplifier 4 and placed on the outgoing line; the binary pulses wil be received by a switching facility (which will be disclosed later) and the switching facility will send back a dial tone which is applied to amplifier 12; the pulses at the output of amplifier 12, which represents the dial tone, are applied to demodulator circuit 13 which converts the pulses into an analog signal and applies it to audio amplifier circuit 15 where the dial tone is made audible at the earpiece 16 thereof. The calling user can now dial the user being called. This is done by interrupting the pulses sent to a switching facility which will either send back a busy signal or connect the calling user with the called user. If a busy signal comes back on the incoming line, it is made audible at earpiece 16.

When a user is called, the switching facility sends pulses which are applied to amplifier 12. The output of this amplifier feeds the coil of relay 8 which causes its contact to assume position 2. When this is done the positive terminal of battery 5 is connected to the set and the ringing circuit 14; the signal produced by ringing circuit 14 is applied to audio amplifier 15 and ringing is made audible at earpiece 16 thereof; and the ringing signal is also attenuated by resistor 17, applied to the delta modulator 3 and sent out as a ringback signal to whoever is calling. Now when the called user picks up his hand set, the called and calling users are connected and can carry on a conversation.

In order to assure synchronized operation, the 40 kc. pulse generator 1 can be corrected in phase by each incoming pulse. This will insure identical repetition rates for incoming and outgoing pulses.

The channel drop facility (CDF) consists of a common circuit and from one to twenty-four individual channel circuits. The common circuit in conjunction with anyone of the individual channel circuits contains all the circuitry necessary to drop a channel and insert a channel into a pulse train. The channel which is dropped from an inserted into the pulse train is determined by the individual channel circuit. Each individual channel circuit is preassigned a specific channel. The channel pulses dropped from the pulse train are transmitted to the user's telephone set. The channel pulses inserted into the pulse train is received from the user's telephone set.

Figure 3:
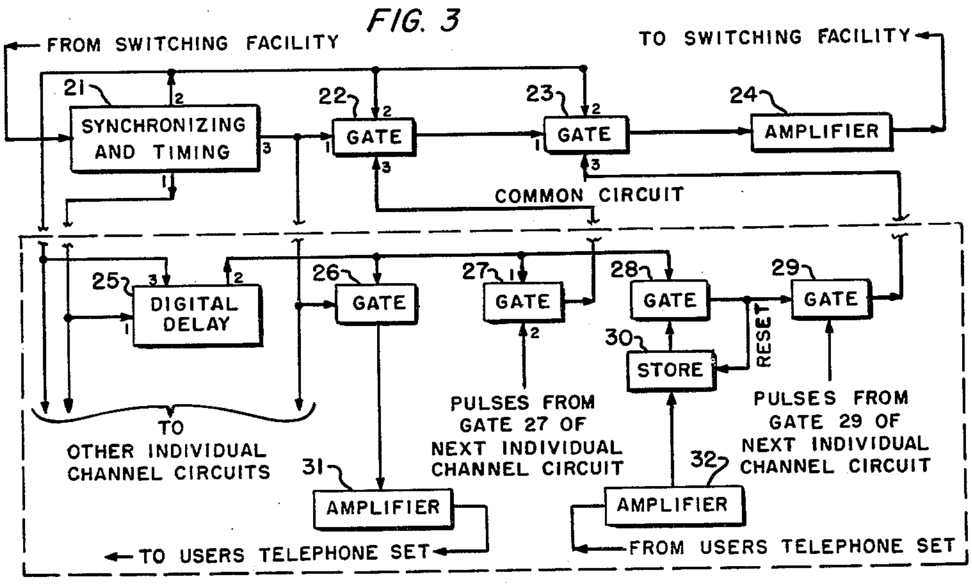
FIGURE 3 shows a block diagram of a channel drop facility.

A channel drop facility is disclosed in block diagram form by FIG. 3. The common circuit consists of a synchronizing and timing device 21, gate 22, gate 23 and amplifier 24. The synchronizing and timing device 21 can be the retiming circuit disclosed by copending application Serial Number 55,811 filed by Holzer and Wolf, now Patent No. 3,071,733. There are of course many other solutions possible and in use. Gate 22 is an "inhibit" gate. When there is a pulse at input 3 of this gate, signals at input 1 cannot pass through the gate. Input 2 is an auxiliary timing input. Gate 23 is an "or" gate. Inputs 1 and 3 are applied to gate 23 while input 2 is for timing. Each individual channel circuit consists of a digital delay 25, gate 26, gate 27, gate 28, gate 29, store 30 and amplifiers 31 and 32. The digital delay 25 can be a delay-line or a shift register. Gates 26 and 28 are "and" gates. Gates 27 and 29 are "or" gates. Store 30 is a flip-flop or it may be a temporary store such as a capacitor.

The purpose of a channel drop facility is to perform the function of dropping and inserting single channels into a multiplexed signal. In the operation of a channel drop facility a multiplexed signal is received by the synchronizing and timing device 21. The multiplexed signal consists of a 40 kc. synchronizing pulse with pulses representing the information being transmitted located between the synchronizing pulses. The multiplexed signal consists of twenty-four channels of information, that is, twenty-four pulses can appear between two successive synchronizing pulses. The position of an information pulse relative to a synchronizing pulse determines which channel it represents. Since there are twenty-four channels a pulse on channel one will appear one millionth of a second after a synchronizing pulse, a pulse on channel two will appear two millionths of a second after a synchronizing pulse, etc. The synchronizing and timing device 21 produces three outputs. Output 1 is a 40 kc. synchronizing pulse which is applied to the digital delay 25 of each of the individual channel circuits. Output 2 of device 21 is a one megacycle timing wave and is applied to gate 22 and gate 23 of the common circuit for retiming purposes. The timing wave may also be applied to digital delay 25, gate 26, gate 28 and gate 29 of the individual channel circuits. However, it is not absolutely necessary to apply the timing wave to the individual channel circuits as they will produce a relatively low timing error without the aid of the timing wave. Output 3 of device 21, which is the regenerated pulse train from the switching facility, is applied to gate 22 of the common circuit and to gate 26 of each of the individual channel circuits.

The operation of a channel drop facility will be described by using a specific example. Suppose that the user of the individual channel circuit assigned to channel twelve is receiving and transmitting information. The 40 kc. synchronizing pulse produced at output 1 of the synchronizing and timing device 21 is applied to digital delay 25, which delays the pulses twelve millionths of a second and the delayed pulses are applied to gate 26. Output 3, of the synchronizing and timing device 21, which is the multiplexed signal, is also applied to gate 26. Since gate 26 is an "and" gate it will produce a pulse output only when the pulses applied to its inputs coincide. Gate 26 will produce pulses only when pulses appear in the twelfth channel of the incoming multiplexed signal. Pulses produced by gate 26 are amplified by amplifier 31 and sent to a user's telephone set. The output of digital delay 25 is also applied to the input 1 of "or" gate 27. The input 2 of gate 27 is the output of gate 27 of another individual channel circuit. Output pulses of gate 27 are representative of all channels dropped at the channel drop facility including the twelfth channel. These pulses are applied to input 3 of gate 22. When a pulse is applied to input 3 of gate 22 there will be no output produced by gate 22. Since a multiplexed signal is applied to input 1 of gate 22 the output of gate 22 will be the multiplexed signal without any information pulses appearing in all dropped channels including the twelfth channel. The number of gates 27 used in a channel drop facility is one less than the number of channels handled by the channel drop facility. Alternatively one "or" gate 27 can be used to handle all individual channel circuits if it has a sufficient number of inputs to handle all individual channel circuits. Pulses from a user's telephone set are amplified by amplifier 32 and then stored by the store 30. The store 30 will be assumed to be a flip flop with two stable conditions. When one side of the flip-flop is conducting there is a representation of an absence of a pulse and when the other side of the flip-flop is conducting there is a representation of the presence of a pulse. When the flip-flop is in the condition representing the presence of a pulse, a voltage is applied to gate 28. The delayed pulses from digital delay 25 are applied to gate 28. Since gate 28 is an "and" gate it will produce pulses at a time representing the twelfth channel when there are pulses stored by store 30. Each time gate 28 produces a pulse a pulse is fed backto the store 30 to reset it to its condition representing the absence of a pulse. The output of gate 28 are the pulses from the user's telephone set ready to be inserted in the channel represented by the individual channel circuit, in our example the twelfth channel. The output of gate 28 is applied to "or" gate 29. Gate 29 is used in the same manner as "or" gate 27. Instead of using several gates 29 one "or" gate may be used to accommodate all individual channel circuits provided the gate has an input for each individual channel circuit. The pulses which are applied to input 3 of gate 23 are the pulses which are being transmitted by all the user's telephone sets which are handled by the channel drop facility. The pulses applied to input 3 of gate 23 are applied at times which are representative of the channels producing them. That is, a pulse transmitted on channel twelve will appear at input 3 twelve millionths of a second after a synchronizing pulse appears at input 1 of gate 23. The output of gate 23 is a multiplexed signal with the information transmitted by all user telephone sets inserted into it. The multiplexed signal is amplified by amplifier 24 and sent to a switching facility. The transmission line between the channel drop facility and the switching facility may include regenerative repeaters (R). Typical repeaters which can be used are described in Bell System Technical Journal, vol. 35, September 1956, "Transistorized Binary Pulse Regenerator" and in a copending application by Holzer and Wolf, Serial Number 55,811.

Four transmission facilities terminate in a switching facility. Each of them provides an outgoing and an incoming pulse train. The incoming pulse trains are demultiplexed so that all channels are physically separated from each other. The incoming bits of each channel are then fed to a pulse sensing device and to a storage circuit. A control unit which is connected to the pulse sensing device will, on information which it receives from the user through the pulse sensing device, establish a crossover point within the switching matrix. Through this crossover point the storage circuit of the calling channel is resampled at a time preassigned to the called channel and this bit of information passes again through the crossover point and is placed into the outgoing pulse train of the called channel. Because of symmetry of the switching matrix the same crossover point may be utilized to resample the stored bits of information of the called channel at a time preassigned to the calling channel. These bits of information are also passed through the crossover point and placed into the outgoing pulse train of the calling channel. Thus a complete interchange of information between the two channels is accomplished.

Figure 4:
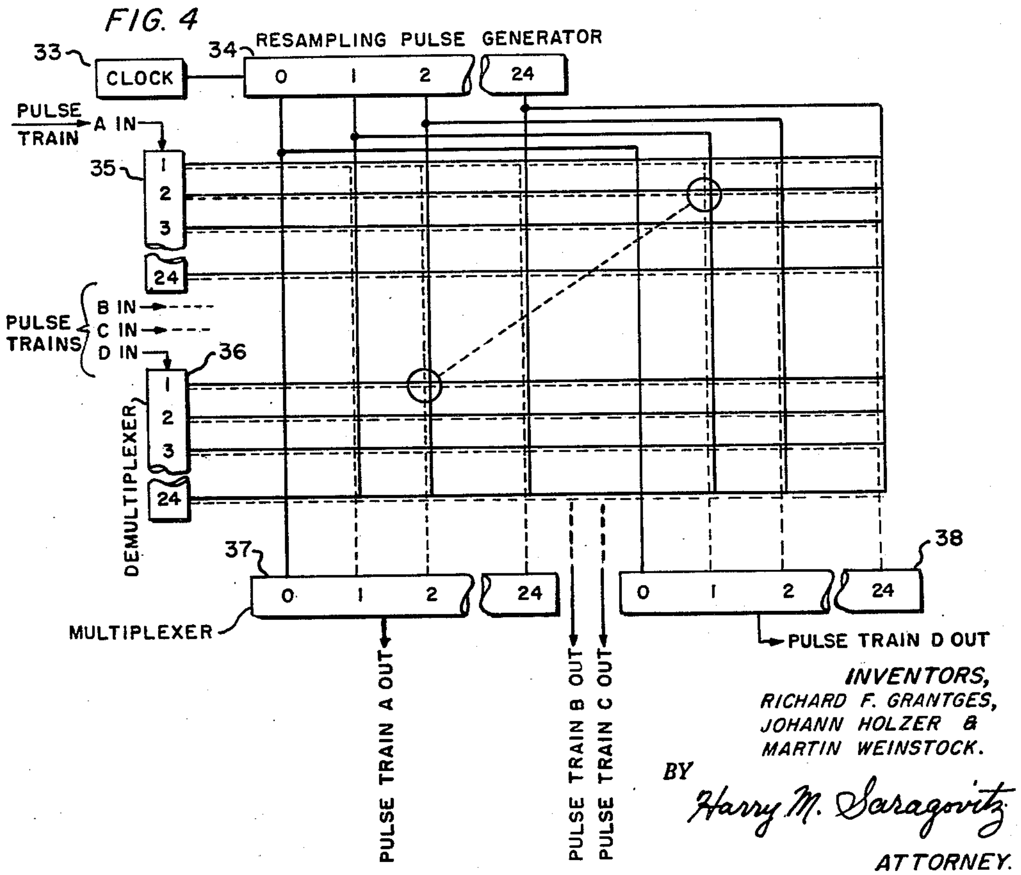
FIGURE 4 shows the overall layout of a switching facility.

FIGURE 4 shows the overall layout of a switching facility. Four pulse trains ($A_{in}$, $B_{in}$, $C_{in}$ and $D_{in}$) are each applied to the input of a separate demultiplexer, where all channels are physically separated from each other. FIGURE 4 shows parts of only two demultiplexers (35 and 36) however, it should be realized that there are four demultiplexers each having twenty-four channel outputs. The bits of each channel are fed to a pulse sensing device and to a storage circuit. A control unit which is connected to the pulse sensing devices will, on orders which it receives from the pulse sensing devices, establish crossover points within the switching matrix. The two circles within the switching matrix of FIGURE 4 will be the two crossover points established if the user assigned to channel 2 of pulse train A calls or is called by the user assigned to channel 1 of pulse train D. The clock 33 generates a one megacycle pulse which is fed to the resampling pulse generator 34. Generator 34 produces twenty-five pulse outputs, each at a rate of 40 kc. per second. The pulses of each output are delayed with respect to the pulses of the output just preceding it by one millionth of a second. The resampling pulse generator 34 can be a frequency division circuit in which there are many possible solutions. For example, it could be a series of flip-flop circuits with appropriate outputs of the flip-flop circuits connected to "and" gates. Alternatively the clock 33 can be a 40 kc. pulse generator and the resampling pulse generator 34 could then be a delay line. The output O of generator 34 is for the purpose of supplying synchronizing pulses for the outgoing pulse trains. Each of the other twenty-four outputs is for resampling the bits of information stored by the storage circuits of the demultiplexers. A switching facility utilizes four multiplexers and each multiplexer produces a pulse train. Parts of only two multiplexers (37 and 38) are shown by FIGURE 4. A multiplexer is an "or" gate with twenty-five inputs.

Figure 5:
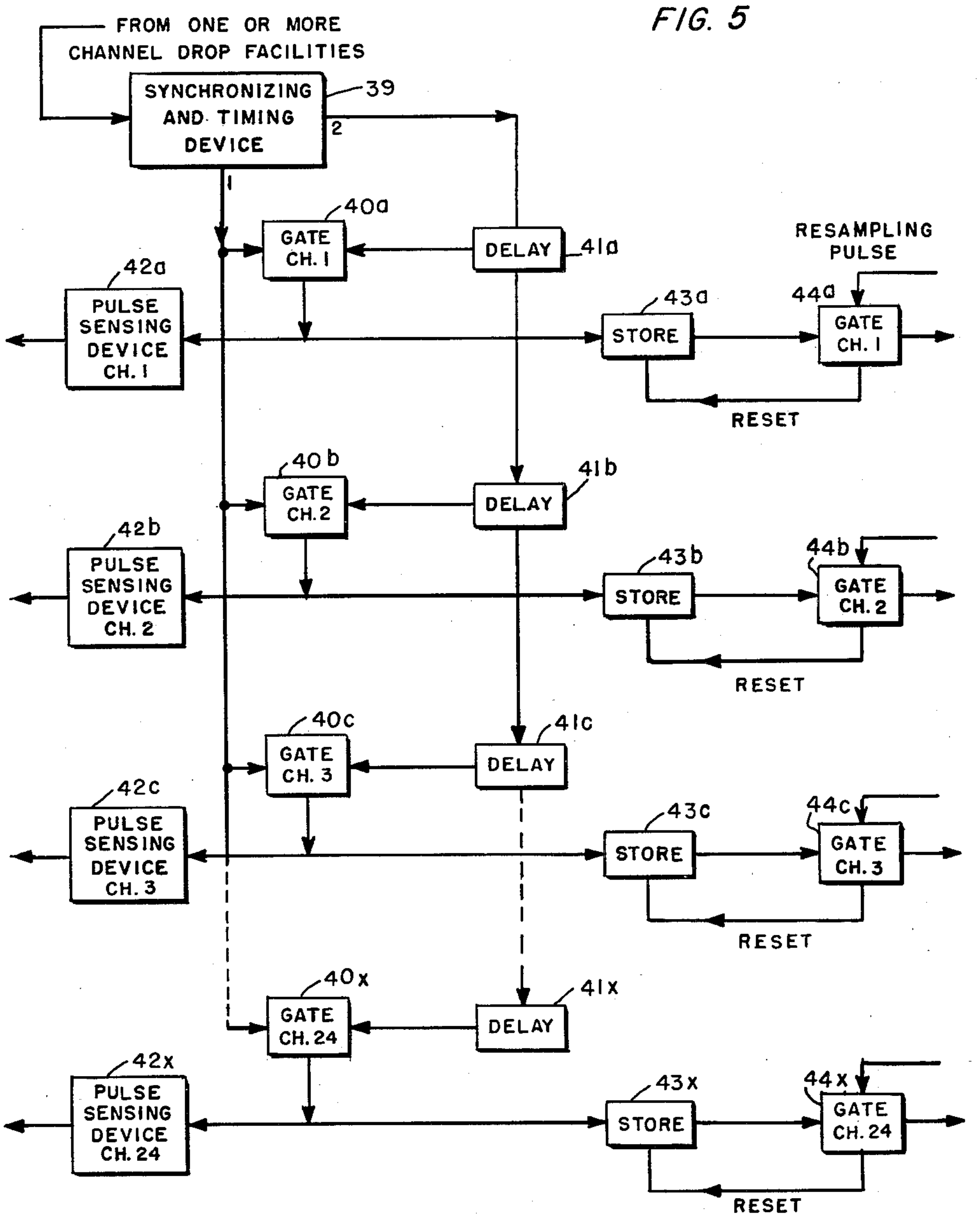
FIGURE 5 shows a block diagram of a demultiplexer used in the invention.

The details of a demultiplexer are shown by FIGURE 5. An incoming pulse train from a channel drop facility is applied to the synchronizing and timing device 39 which can be the device disclosed by co-pending application by Holzer and Wolf, Serial Number 55,811. The synchronizing and timing device 39 has two outputs. Output 1 is the incoming pulse train with the pulses reshaped and time jitter removed. Output 2 is a 40 kc. synchronizing pulse. A third output of device 39 could be a timing wave which would be applied to the delays 41 for synchronizing purposes. Output 1 is applied to gate 40 of each channel. Gates 40 are "and" gates. Output 2 is applied to the delay 41*a* of channel 1. The output of the delay 41*a* of channel 1 is applied to the input of delay 41*b* of channel 2, the output of the delay 41*b* of channel 2 is applied to the input of the delay 41*c* for channel 3, etc. The delays 41 can be delay lines or digital delays. The output of each delay 41 is applied to a gate 40. Each delay 41 delays the pulses applied to it one millionth of a second. The output of each gate 40 is the information for that particular channel which appeared in the incoming pulse train. The output of each gate 40 is applied to a pulse sensing device 42 which detects signalling information and feeds it to the control unit. The pulse sensing device may be a demodulator which demodulates incoming signalling tones or it is just a simple R-C integration network which could detect the presence or absence of a pulse sequence in the particular channel. The latter way of signalling is proposed because of its simplicity. The control unit controls the switching in the switching matrix. Control units are well known to one skilled in the art; therefore, a control unit is not disclosed in this specification. The output of each gate 40 is also applied to a store 43 which can be a flip-flop with two stable conditions. In the absence of a pulse applied to the flip-flop it maintains one condition and does not store information. When a pulse is applied to the flip-flop it assumes the other condition and stores the pulse for resampling. The output of the store 43 is applied to gate 44 which is an "and" gate. A resampling pulse is also applied to the gate 44. When a pulse is applied to both inputs of gate 44 it produces a pulse output. The output pulse is fed back to the store 43 to reset it to its condition representing the absence of a pulse. The output of gate 44 is also fed to the switching matrix.

The outstanding characteristic of the switching facility is that signals are switched in digital form only, and at the same time the multiplexing operation is performed. The control equipment for the switching facility is of no particular interest here since it does not represent anything new. Control equipment of any crosspoint or crossbar switching facilities could be adapted for this function. The switching process as such is new and therefore the only matter of interest. The problem is to rearrange digital time division signals in such a way that information can be interchanged between any two digital channels. For the purpose of explanation, let us assume that there are only four users of a switching facility. Connections should be established between any two of these four users on a four wire basis, that is, separate transmit and receive channels. For our four users let us assume two groups of two channels each. We should keep in mind that each group of channels appears only on one single conductor in time division and that there is no correlation between the times the signals of one channel are being received and the times the signals of the same channel are being transmitted. The only known fact is that for each received binary bit one bit will be transmitted.

Figures 6, 7, 8:
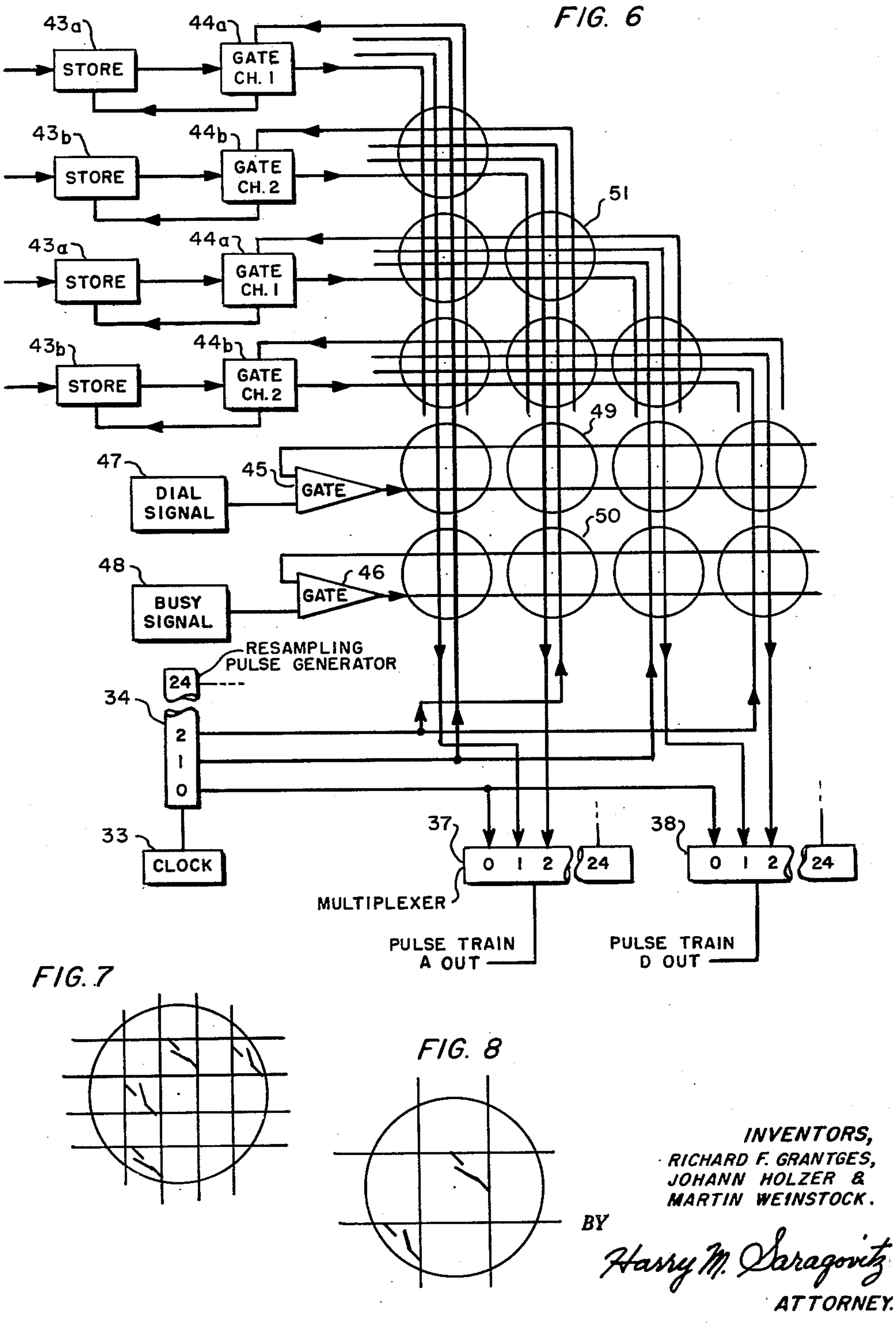
FIGURE 6 shows a block diagram of a switching facility in accordance with this invention.
FIGURES 7 and 8 show functional diagrams of the switching devices used in this invention.

A block diagram of a switching facility having only four users is shown by FIGURE 6. A switching facility usually handles ninety-six users but we assumed four users merely for the purpose of explanation. We will assume two pulse trains A and D with users assigned to channels 1 and 2 of each pulse train. The information bits from the two channels of pulse train $A_{in}$ are stored on the stores *43a* and *43b* in the upper left hand corner of FIGURE 6. The information bits from the two channels of pulse train $D_{in}$ are stored on the other two stores *43a* and *43b*. The stores 43 and gates 44 of FIGURE 6 correspond to the stores 43 and gates 44 of FIGURE 5. The resampling pulse generator 34 of FIGURE 6 is the same as that in FIGURE 4 except only the first three outputs are utilized. The multiplexers 37 and 38 of FIGURE 6 are the same as those in FIGURE 4 except only the first three inputs are utilized. The switching facility of FIGURE 4 utilizes two switchinug devices with two switches each for the two users which are connected together. In FIGURE 6 the two switching devices are grouped together to make one switching device with four switches for each two users which are connected together. There are many implementations possible for this switch. Here we will describe a typical implementation making use of a unique magnetic device called a "transfluxor." The Transfluxor is disclosed in an article by J. A. Rajchman and A. W. Lo, "The Transfluxor" Proceedings of IRE, vol. 44, March 1956. The Transfluxor has the property of a single bit memory associated with a number of gates. For the purpose of our model we can picture the transfluxor as a four-pole single-throw toggle-switch, which can be switched "on" and "off" by electronic means. A functional drawing of a four switch transfluxor is shown by FIGURE 7. When the Transfluxor is "off" the four switches are open as shown. When the Transfluxor is "on" the four switches are closed. A signal from the control unit will cause the Transfluxor to assume its "on" position. The switching facility of FIGURE 6 shows six "four switch" Transfluxors and also eight "two switch" Transfluxors. A function drawing of a two switch Transfluxor is shown by FIGURE 8. The dial signal device 47 and the busy signal device 48 are pulse generators which generate pulse which can be heard at the user's telephone sets as a dial tone or a busy signal. The gates 45 and 46 are "and" gates.

To explain the operation of the switching facility of FIGURE 6 it will be assumed that the user assigned to channel 2 of pulse train A is calling the user assigned to channel 1 of pulse train D. When the user assigned to channel 2 of pulse train A picks up his hand set the control unit will be notified and it will switch "on" transfluxor 49. Pulses from output 2 of generator 34 are applied through transfluxor 49 to gate 45 causing a dial signal to be applied back through transfluxor 49 to input 2 of multiplexer 37 where it is inserted into pulse train A and sent back to the user where he will hear a dial tone. The user then dials the number of the called user which is assigned to channel 1 of pulse train D. If the called user's line is busy the control circuit will switch "on" transfluxor 50 and a busy signal is sent back to the calling user. If the called user's line is not busy the Transfluxor will be switched "on" by the control unit and pulses from output 1 of generator 34 will be applied through transfluxor 51 to gate *44b* of channel 2 of pulse train A which removes information bits stored on store *43b* and applies them back through transfluxor 51 to input 1 of multiplexers 38 where they are inserted into pulse train D. These pulses cause the called user's telephone to ring. When the called user picks up his set the two users are connected and conversation may now take place. The flow of information is then as follows: pulses from output 1 of the generator 34 are applied through transfluxor 51 to gate *44b* of pulse train A which removes information bits stored by store *43b* and applies them back through transfluxor 51 to input 1 of multiplexer 38 where they are inserted into channel 1 of pulse train D and sent to the called user. Pulses from output 2 of generator 34 are applied through transfluxor 51 to gate *44a* of pulse train D which removes information bits stored by store *43a* and applies them back through transfluxor 51 to input 2 of multiplexer 37 where they are inserted into channel 2 of pulse train A and sent to the calling user.

Although we have described our invention with a certain degree of particularity, it is understood that the present disclosure has been made only by way of example and that numerous changes in the details of construction and the combination and arrangement of number of time slots per group, number of groups, information rates, parts, etc. may be resorted to without departing from the spirit and the scope of the invention as hereinafter claimed.

What is claimed is:

1. A telephone system for transmitting information in binary digital form in which each subscriber to the telephone system is preassigned to one group of several groups of subscribers and all information sent or received by a group of subscribers is transmitted on a time sharing basis between pulses of a constant frequency synchronizing pulse train, each subscriber being preassigned to a time interval between successive synchronizing pulses comprising a user's telephone set for each subscriber to the telephone system, each users' telephone set including means for converting audible sounds into binary bits of information and means for converting binary bits of information into audible sounds, separate trunk line means for connecting each of said groups of subscriber's telephone sets to a switching facility with each of said trunk line means having originating and terminating ends in the said switching facility, means in the said switching facility for producing the said constant frequency synchronizing pulses at the said originating ends of the said trunk line means, multiplexing means located outside the switching facility for each of said groups of subscriber's telephone sets for inserting into said trunk line means in the said preassigned time intervals the said binary bits of information from said means for converting audible sounds into binary bits of information, demultiplexing means in the said switching facility at the said terminating ends of said trunk line means for removing the binary bits of information from each of said time intervals and separately storing the bits of information by a storage means, multiplexing means in the said switching facility for inserting selected ones of said stored bits of information into said trunk line means near the said originating ends, and demultiplexing means connected to the said trunk line means for separating the said inserted stored bits of information and applying them to the said means for converting binary bits of information into audible sounds.

2. A telephone system for transmitting information in binary digital form on a time sharing basis comprising a user's telephone set for each subscriber to the telephone system, each user's telephone set including means for converting audible sounds into binary bits of information and means for converting binary bits of information into audible sounds, trunk line means for connecting the user's telephone sets to a switching facility with the trunk line means having originating and terminating ends in the said switching facility, means in the said switching facility for producing constant frequency pulses in said trunk line means at the said originating ends of the trunk line means, first multiplexing means for each user's telephone set for inserting binary bits of information from said means for converting audible sounds into binary bits of information into said trunk line means at preassigned time intervals between said pulses, first demultiplexing means in said switching facility at the said terminating ends of the trunk line means for physically separating the said binary bits of information from said time intervals, storage means for storing said separated binary bits of information, second multiplexing means located in the switching facility near the said originating ends of the trunk line means, switching means connected to apply selected bits of said stored bits of information to the said second multiplexing means for inserting them into preassigned time intervals between the said constant frequency pulses and second demultiplexing means connected to the said trunk line means for separating the said inserted stored bits of information and applying them to the said means for converting binary bits of information into audible sounds.

3. A telephone system in which all information is transmitted in binary digital form on a time division basis, comprising a users' telephone set for each subscriber to the telephone system, each user's telephone set including means for converting audible sounds into binary bits of information and means for converting binary bits of information into audible sounds, first demultiplexing means for receiving multiplexed signals and physically separating the channels of binary bits of information contained in the multiplexed signals, storage means for storing the said channels of binary bits of information, first multiplexing means forming multiplexed signals by inserting selected ones of said channels of stored binary bits of information into selected channels of the formed multiplexed signals, second demultiplexing means receiving the multiplexed signals from the said first multiplexing means and physically separating the channels of binary bits of information from the multiplexed signals, means connecting each of the said separated channels of binary bits of information to a preassigned one of the said means for converting binary bits of information into audible sounds, second multiplexing means for receiving binary bits of information from said means for converting audible sounds into binary bits of information and inserting the binary bits of information into predetermined channels to form the said multiplexed signals which are applied to said first demultiplexing means.

4. A communication system for transmitting information in digital form comprising means for converting analog information into digital bits of information, first multiplexing means forming a multiplexed pulse train containing said converted digital bits of information, first demultiplexing means receiving said multiplexed pulse train and separating said converted digital bits of information, means for storing said separated converted digital bits of information, second multiplexing means forming a multiplexed pulse train containing said stored digital bits of information, second demultiplexing means receiving said multiplexed pulse train containing said stored digital bits of information and separating said digital bits of information therefrom, means for converting digital bits of information into analog information, and means connecting said separated digital bits of information to the said means for converting digital bits of informaton into analog information.

5. A communication system for transmitting information in digital form comprising means for converting analog information into digital bits of information and for converting digital bits of information into analog information for each user of the communication system, a switching facility, trunk line means for transmitting digital information from all users of the communication system to the switching facility and for transmitting digital information from the switching facility to all users of the communication system, first multiplexing means connected to said trunk line means for forming multiplexed pulse trains containing said converted digital bits of information, first demultiplexing means included in said switching facility and connected to sad trunk line means for separating said converted digital bits of information from said multiplexed pulse trains, temporary storage means included in said switching facility for storing separately the said separated digital bits of information from each user of the communication system, second multiplexing means included in said switching facility and connected to said trunk line means for forming multiplexed pulse trains containing said stored digital bits of information, second demultiplexing means connected to said trunk line means for separating said stored digital bits of information from said multiplexed pulse train and means connecting said separated stored digital bits of information to the said means for converting digital bits of information into analog information.

6. A communication system for transmitting information in digital form by multiplexed pulse trains with each pulse train consisting of several channels of information comprising, a switching facility, trunk line means having originating and terminating ends in the said switching facility, first multiplexing means for every user of the communication system for forming multiplexed pulse trains with digital information from the users inserted into preassigned channels of the pulse trains, first demultiplexing means connected to the terminating ends of said trunk line means for separating all channels of information, temporary storage means for separately storing all of said separated channels of information, second multiplexing means connected to the said originating ends of said trunk line means, switching means for interchanging information between any two selected channels including means for inserting the information stored by the said storage means for one of said two selected channels into the other of said two selected channels of said second multiplexing means and including means for inserting the information stored by the said storage means for the said other of said two selected channels into the said one of said two selected channels of said second multiplexing means, and second demultiplexing means connected to said trunk line means for separating the information which was inserted into the trunk line means from said storage means.

7. In a communication system having means for producing binary digital information and for transmitting said binary digital information on a time sharing basis in which the information is transmitted in pulse trains consisting of constant frequency synchronizing pulses with nonconstant frequency information pulses located between the constant frequency synchronizing pulses and wherein the position of a non-constant frequency information pulse relative to a constant frequency synchronizing pulse is determinative of the channel on which it is transmitted means for interchanging information between any two channels comprising demultiplexing means receiving a plurality of said pulse trains and extracting the said information pulses therefrom, separate temporary storage means for each channel for storing said extracted information pulses, switching means for interconnecting any two selected channels, a first and second multiplexing means, said switching means connecting the storage means of one of said two selected channels to said first multiplexing means for inserting information pulses stored by said storage means of said one channel into the other of said two selected channels and said switching means connecting the storage means of the said other of said two selected channels to said second multiplexing means for inserting information stored by said storage means of the said other channel into the said one of said two selected channels.

8. In a communication system having means for producing digital information and for transmitting said digital information by multiplexed pulse trains consisting of constant frequency synchronizing pulses with said digital information included as pulses located in preassigned time intervals between the synchronizing pulses means for interchanging information between any two selected time intervals of the pulse trains comprising demultiplexing means receiving said pulse trains and separating the information pulses appearing in each of said time intervals, separate storage means for storing the said separated information pulses, pulse generating means for generating synchronizing pulses and pulses during each of said time intervals, switching means connecting the said generated pulses during one of said two selected time intervals to the storage means of the other of said two selected time intervals and for connecting the said generated pulses during the other of said two selected time intervals to the storage means of the said one of said two selected time intervals, means included in each of the said separate storage means for producing a pulse each time a pulse is received from the pulse generating means if an information pulse is stored by said separate storage means, multiplexing means, means connecting said synchronizing pulses generated by said pulse generating means to said multiplexing means and means included in said switching means for connecting said pulses produced by each of said separate storage means to said multiplexing means for forming said multiplexed pulse trains.

9. In a communication system having means for producing binary digital information and for transmitting said binary digital information on a time sharing basis in which the binary digital information is transmitted in pulse trains consisting of constant frequency synchronizing pulses with non-constant frequency information pulses of said binary digital information located between the constant frequency synchronizing pulses and wherein the time relation of an information pulse relative to a constant frequency synchronizing pulse is determinative of the channel on which it is transmitted means for interchanging information between any two channels comprising demultiplixing means receiving a plurality of said pulse trains and extracting the said information pulses therefrom, a storage means for each channel for storing said extracted information pulses, switching means for interconnecting any two selected channels said switching means connecting the storage means of one of said two selected channels to a multiplexing means for the other of said two selected channels and connecting the storage means of the said other of said two selected channels to a multiplexing means for the said one of said two selected channels, pulse generating means for generating said constant frequency synchronizing pulses with pulses between the synchronizing pulses at times corresponding to all channels, means connecting the pulse generating means to the storage means of said one of said two selected channels to apply to the storage means a pulse at a time corresponding to the said other of said two selected channels so as to cause the storage means to release its stored information to the said multiplexing means for the other of said two selected channels, means connecting the pulse generating means to the storage means of said other of said two selected channels to apply to the storage means a pulse at a time corresponding to the said one of said two selected channels so as to cause the storage means to release its stored information to the said multiplexing means for the said one of said two selected channels and means connecting the said pulse generating means to all said multiplexing means for supplying the said synchronizing pulses to all said multiplexing means.

10. In a communication system having means for producing digital information and for transmitting said digital information by multiplexed pulse trains consisting of constant frequency synchronizing pulses of said digital information with information pulses located in preassigned time intervals between the synchronizing pulses means for interchanging information between any selected two of said time intervals comprising demultiplexing means receiving said multiplexed pulse trains for removing the digital information contained in each of the said time intervals, temporary storage means for separately storing said removed digital information, pulse generating means for generating said constant frequency synchronizing pulses and pulses within each of said time intervals, switching means including four switches for interchanging information between said two selected time intervals, the first of said switches connecting the said generated pulses within the time interval corresponding to one of said two time intervals to the said storage means of the other of said two time intervals for extracting the information pulses stored by the storage means, the second of said switches connecting said extracted information pulses to a means for combining these extracted information pulses with said generated constant frequency synchronizing pulses to form a multiplexed pulse train, the third of said switches connecting the said generated pulses within the time interval corresponding to the said other of said two time intervals to the said storage means of the said one of said two time intervals for extracting the information pulses stored by the storage means, the fourth of said switches connecting said extracted information pulses to a means for combining these extracted information pulses with said generated constant frequency synchronizing pulses to form a multiplexed pulse train.

11. In a communication system having means for producing digital information and for transmitting said digital information by a multiplexed pulse train consisting of constant frequency synchronizing pulses with information pulses of said digital information located in preassigned time intervals between the synchronizing pulses, multiplexing means for inserting information pulses into a predetermined one of said preassigned time intervals comprising means for generating the said synchronizing pulses, delay means receiving said generated synchronizing pulses and delaying them until they coincide with said predetermined one of said preassigned time intervals, storage means for receiving and storing information pulses, coincidence gating means connected to said storage means and connected to receive said delayed synchronizing pulses for producing pulses when pulses stored by the storage means and delayed synchronizing pulses coincide and means for combining the said synchronizing pulses and said pulses produced by the coincidence gating means to form a multiplexed pulse train.

References Cited by the Examiner

UNITED STATES PATENTS

| | | | |
|---|---|---|---|
| 2,584,987 | 12/52 | Deloraine | 179—15 |
| 2,902,542 | 9/59 | Treadwell | 179—15 |
| 2,917,583 | 12/59 | Burton et al. | 179—15 |
| 2,957,943 | 10/60 | Rack | 178—43.5 |
| 3,030,448 | 4/62 | Leonard et al. | 179—15 |
| 3,032,610 | 5/62 | Villars | 178—43.5 |
| 3,049,593 | 8/62 | Touraton et al. | 179—15 |

DAVID G. REDINBAUGH, *Primary Examiner.*

L. MILLER ANDRUS, ROBERT H. ROSE, *Examiners.*